US012578045B2

(12) United States Patent
Zheng

(10) Patent No.: US 12,578,045 B2
(45) Date of Patent: Mar. 17, 2026

(54) HOSE CONNECTOR ASSEMBLY

(71) Applicant: Aiqi Zheng, Zhongshan (CN)

(72) Inventor: Aiqi Zheng, Zhongshan (CN)

( * ) Notice: Subject to any disclaimer, the term of this patent is extended or adjusted under 35 U.S.C. 154(b) by 0 days.

(21) Appl. No.: 18/741,600

(22) Filed: Jun. 12, 2024

(65) Prior Publication Data

US 2024/0328550 A1     Oct. 3, 2024

Related U.S. Application Data

(63) Continuation-in-part of application No. 17/535,481, filed on Nov. 24, 2021, now Pat. No. 12,025,252, which is a continuation-in-part of application No. 16/869,587, filed on May 7, 2020, now Pat. No. 11,326,725.

(60) Provisional application No. 63/507,545, filed on Jun. 12, 2023, provisional application No. 62/860,168, filed on Jun. 11, 2019, provisional application No. 62/844,612, filed on May 7, 2019.

(51) Int. Cl.
*F16L 27/08*          (2006.01)
(52) U.S. Cl.
CPC ................................ *F16L 27/0828* (2013.01)
(58) Field of Classification Search
CPC .. F16L 33/223; F16L 27/0828; F16L 25/0036
See application file for complete search history.

(56) References Cited

U.S. PATENT DOCUMENTS

| | | | |
|---|---|---|---|
| 4,186,946 A | 2/1980 | Snow | |
| 6,733,046 B1 | 5/2004 | Rief | |
| 2005/0275220 A1 | 12/2005 | Shu | |
| 2015/0219259 A1 | 8/2015 | Weems et al. | |
| 2017/0211735 A1 | 7/2017 | Papafagos et al. | |
| 2019/0226615 A1* | 7/2019 | Wu ........................ | F16L 33/223 |
| 2021/0062952 A1* | 3/2021 | De Nora ............... | F16L 33/223 |
| 2021/0199218 A1* | 7/2021 | Lin ....................... | F16L 33/225 |

FOREIGN PATENT DOCUMENTS

EP          1342029 B1     9/2004

* cited by examiner

*Primary Examiner* — Zachary T Dragicevich

(57)          ABSTRACT

A hose connector assembly is an apparatus that serves as a rotatable pipe joint to allow the formation of a fluid connection between separate plumbing parts, such as two hoses or a hose and a water spout. The apparatus includes a hose adapter, a screw cap, an intermediate fitting, a proximal annular brace, and a hose connector. The hose adapter allows the secure connection of the apparatus to a plumbing part, such as a spout, a hose, or other pipe fittings. The screw cap allows the rotation of the intermediate fitting to enable the rotation of modular subassemblies of the apparatus about the intermediate fitting. The intermediate fitting also allows the detachable connection between the modular subassemblies of the apparatus. The hose connector facilitates the attachment of the apparatus to the target hose end. The proximal annular brace ensures the connection of the hose connector to the target hose end.

13 Claims, 27 Drawing Sheets

1

HOSE CONNECTOR ASSEMBLY

The current application claims a priority to a U.S. provisional application Ser. No. 63/507,545 filed on Jun. 12, 2023.

The current application is also a continuation-in-part (CIP) application of a U.S. non-provisional application Ser. No. 17/535,481 filed on Nov. 24, 2021. The U.S. non-provisional application Ser. No. 17/535,481 claims a priority to a U.S. non-provisional application Ser. No. 16/869,587 filed on May 7, 2020. The U.S. non-provisional application Ser. No. 16/869,587 claims a priority to a U.S. provisional application Ser. No. 62/844,612 filed on May 7, 2019 and a priority to a U.S. provisional application Ser. No. 62/860, 168 filed on Jun. 11, 2019.

FIELD OF THE INVENTION

The present invention relates generally to hose accessories and plumbing supplies. More specifically, the present invention discloses a hose connector assembly that serves as a rotatable pipe joint to allow the connected hose end to rotate.

BACKGROUND OF THE INVENTION

Hose fittings are mechanical devices that enable the connection of hoses to external devices or to other hoses for various applications. Hose fittings are designed in various shapes and sizes and can be made from different materials such as brass, stainless steel, and plastic. A proper selection of a hose fitting is necessary to ensure a secure and leak free connection, which is critical in the target application. Traditional hose fittings are designed with connectors as a single part to enable the secure connection between the separate devices. This design creates issues where if any part of the connector is damaged, the entire connector needs to be replaced, which increases the maintenance costs of the whole application. Modular connectors with replaceable parts have been made available to eliminate those weaknesses. However, modular connectors lack proper anti-leak features between the different components, which result in poor sealing performance.

Therefore, an objective of the present invention is to provide a hose connector assembly that can serve as a rotatable pipe joint for hoses and other plumbing parts to help eliminate damage to the connected parts. The present invention creates a secure, leak-proof connection with various replaceable components that allows the user to easily perform maintenance on the different parts of the hose connector assembly. Another objective of the present invention is to provide a hose connector assembly that allows the connected parts to rotate while connected. The present invention allows the parts connected via the present invention to rotate so that none of the connected parts are damaged. Another objective of the present invention is to provide a hose connector assembly that can be easily assembled and disassembled by the user without the use of other tools. Additional features and benefits of the present invention are further discussed in the sections below.

SUMMARY OF THE INVENTION

The present invention discloses a hose connector assembly that creates a leak-proof connection between separate hoses or other plumbing parts while enabling the rotation of the connected parts about the present invention. In the preferred embodiment, the present invention is designed to enable the sealed connection between two separate hoses or between a hose and a plumbing part, such as a water spout. To do so, the present invention includes a modular assembly designed to enable the secure attachment of the present invention to a target hose end. The present invention includes a first subassembly designed to be easily connected to the end of the hose. The first subassembly can accommodate traditional single-layer hoses or can be adapted to accommodate multi-layer hoses. Further, the present invention can include a second subassembly that can be connected to another hose or to a plumbing part, such as a water spout. Further, both the first subassembly and the second subassembly can be selectively connected to each other to complete the hose adapter assembly. Furthermore, the connection between the first subassembly and the second subassembly is designed to allow for the rotation of both subassemblies about each other to prevent damage to the present invention or the connected parts.

DETAILED DESCRIPTION OF THE INVENTION

Figure 1:
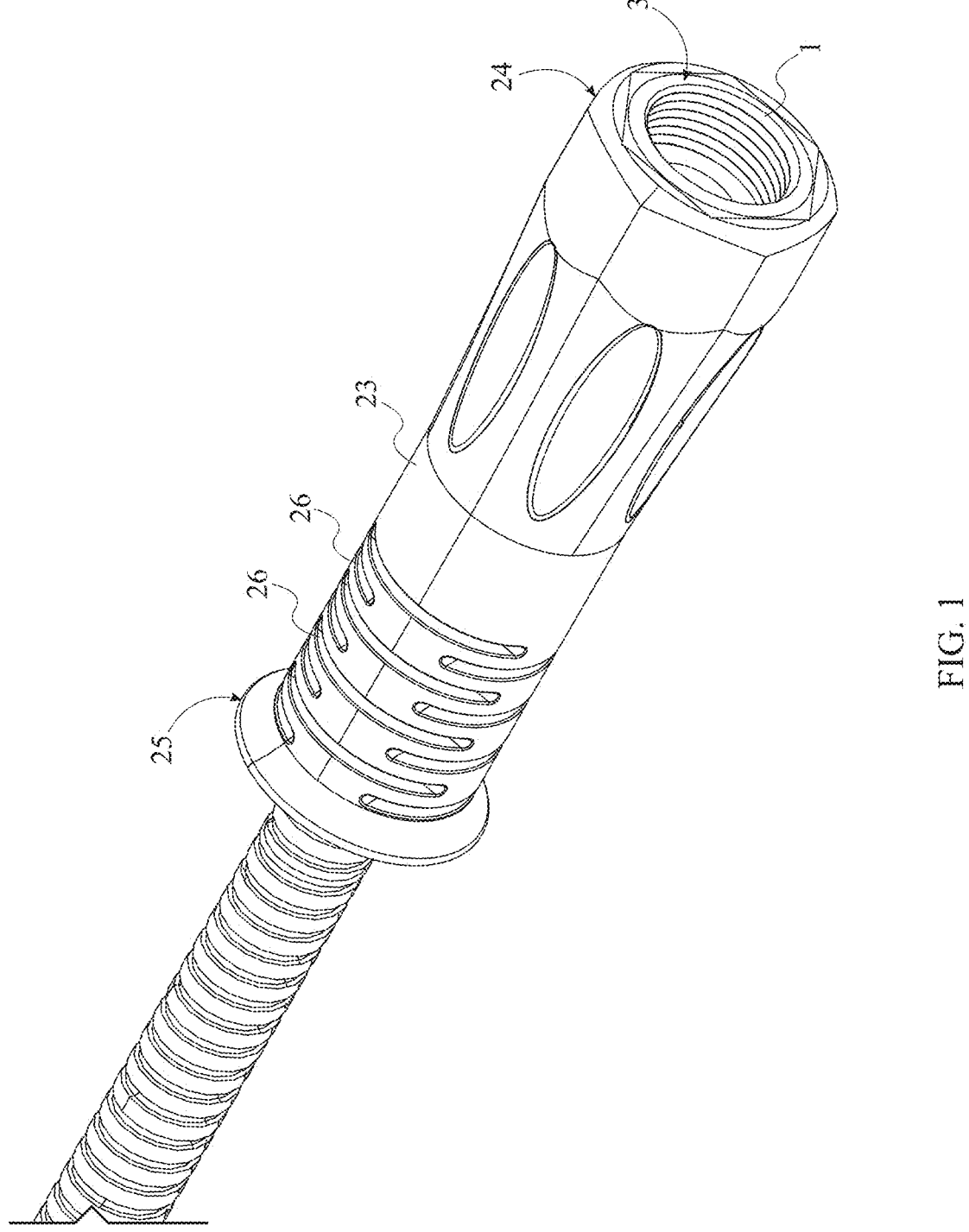
FIG. 1 is a top-front perspective view of an embodiment of the present invention, wherein the hose connector assembly is shown attached to a double layer hose.
Figure 2:
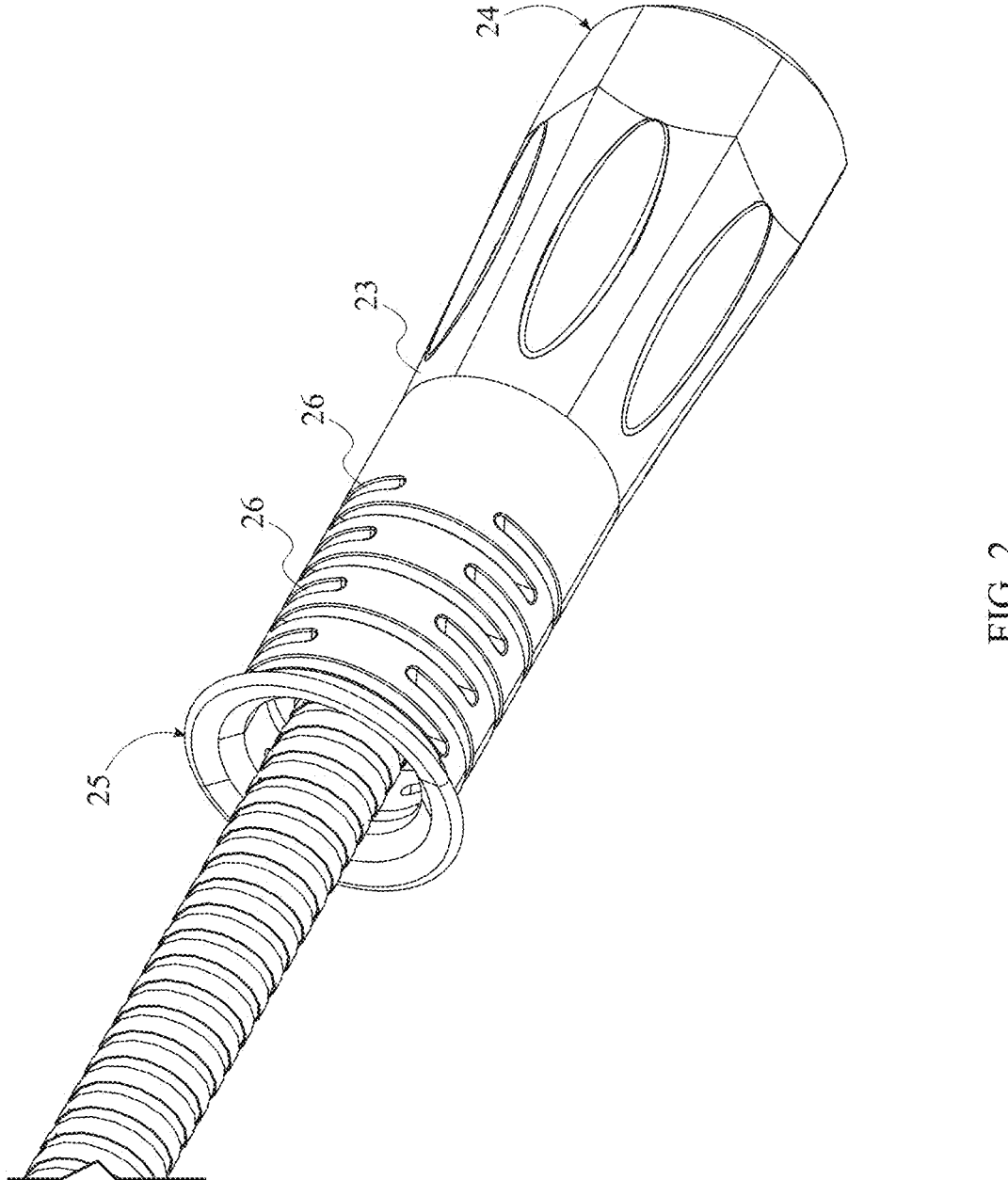
FIG. 2 is a bottom-rear perspective view thereof.
Figure 3:
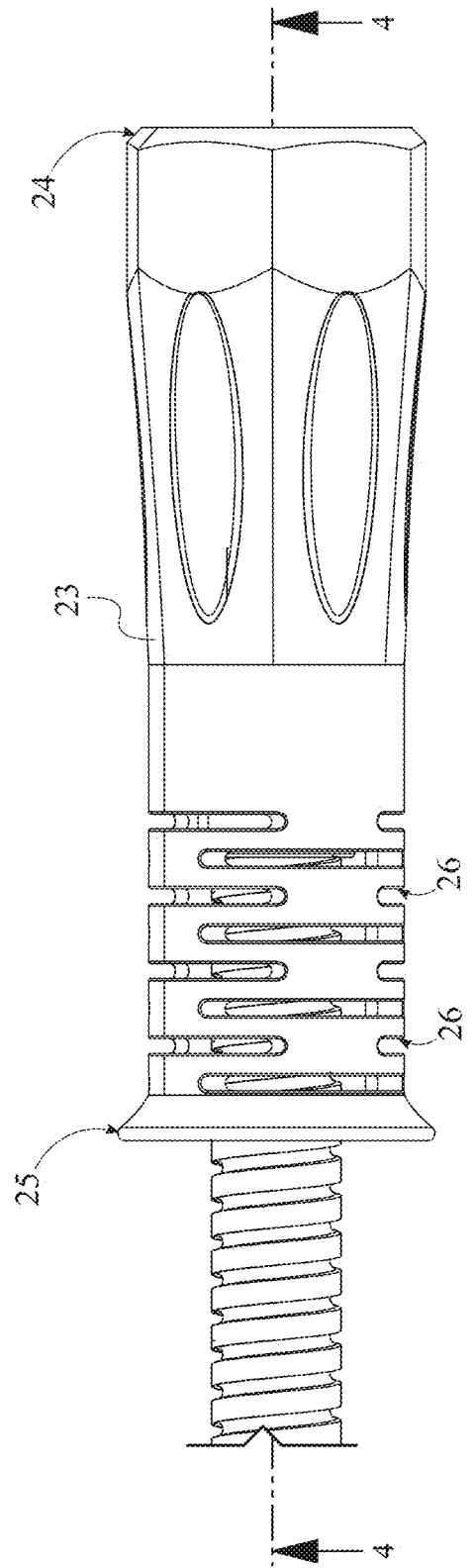
FIG. 3 is a top view thereof.
Figure 4:
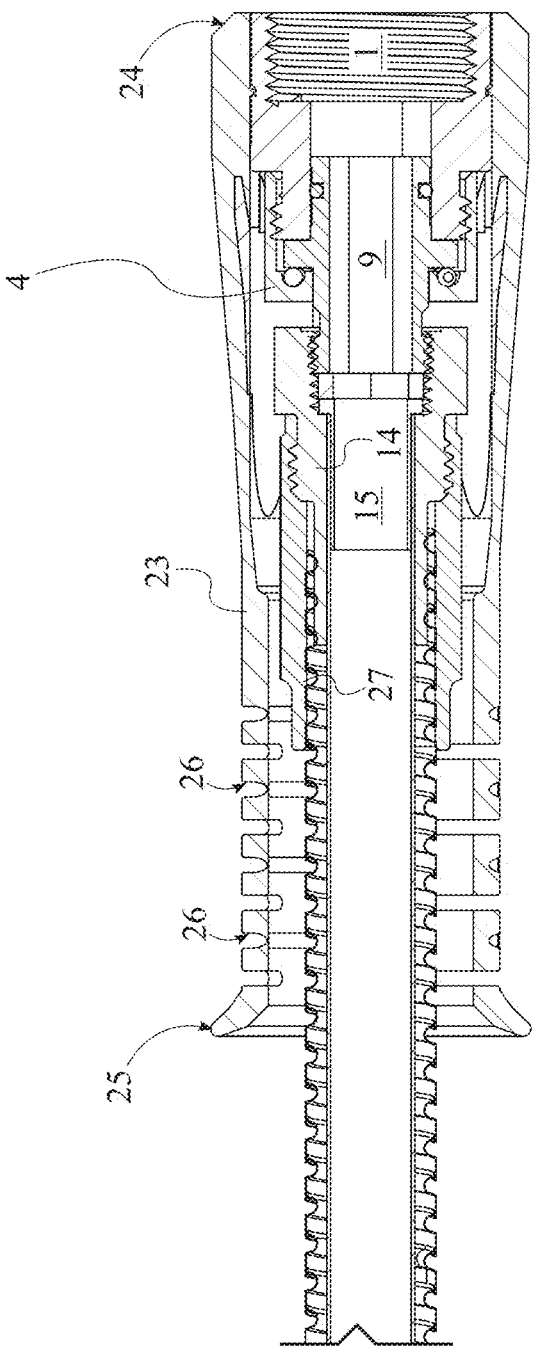
FIG. 4 is a horizontal cross-sectional view taken along line 4-4 in FIG. 3.
Figure 5:
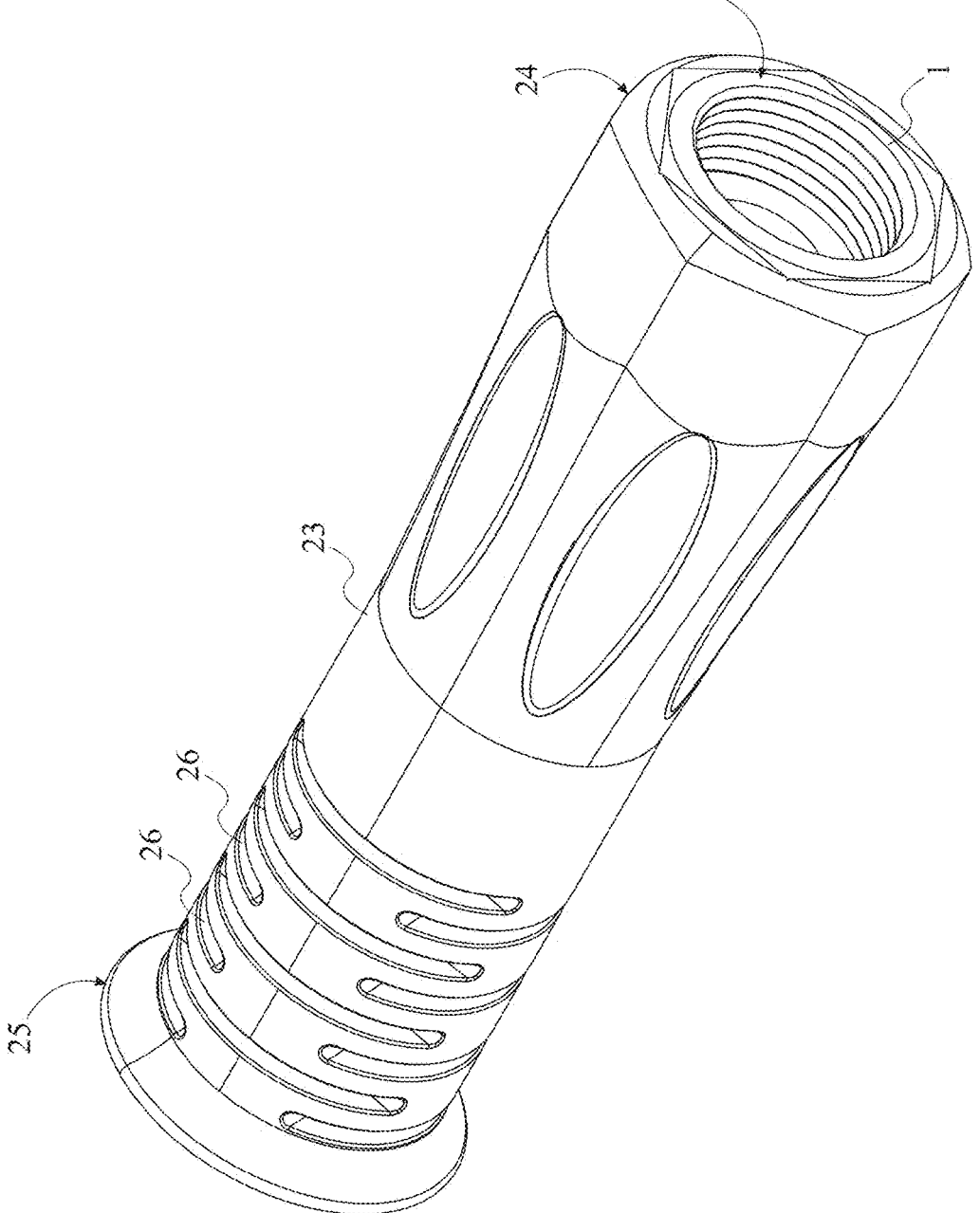
FIG. 5 is a top-front perspective view thereof, wherein the hose connector assembly is not shown connected to a double layer hose.
Figure 6:
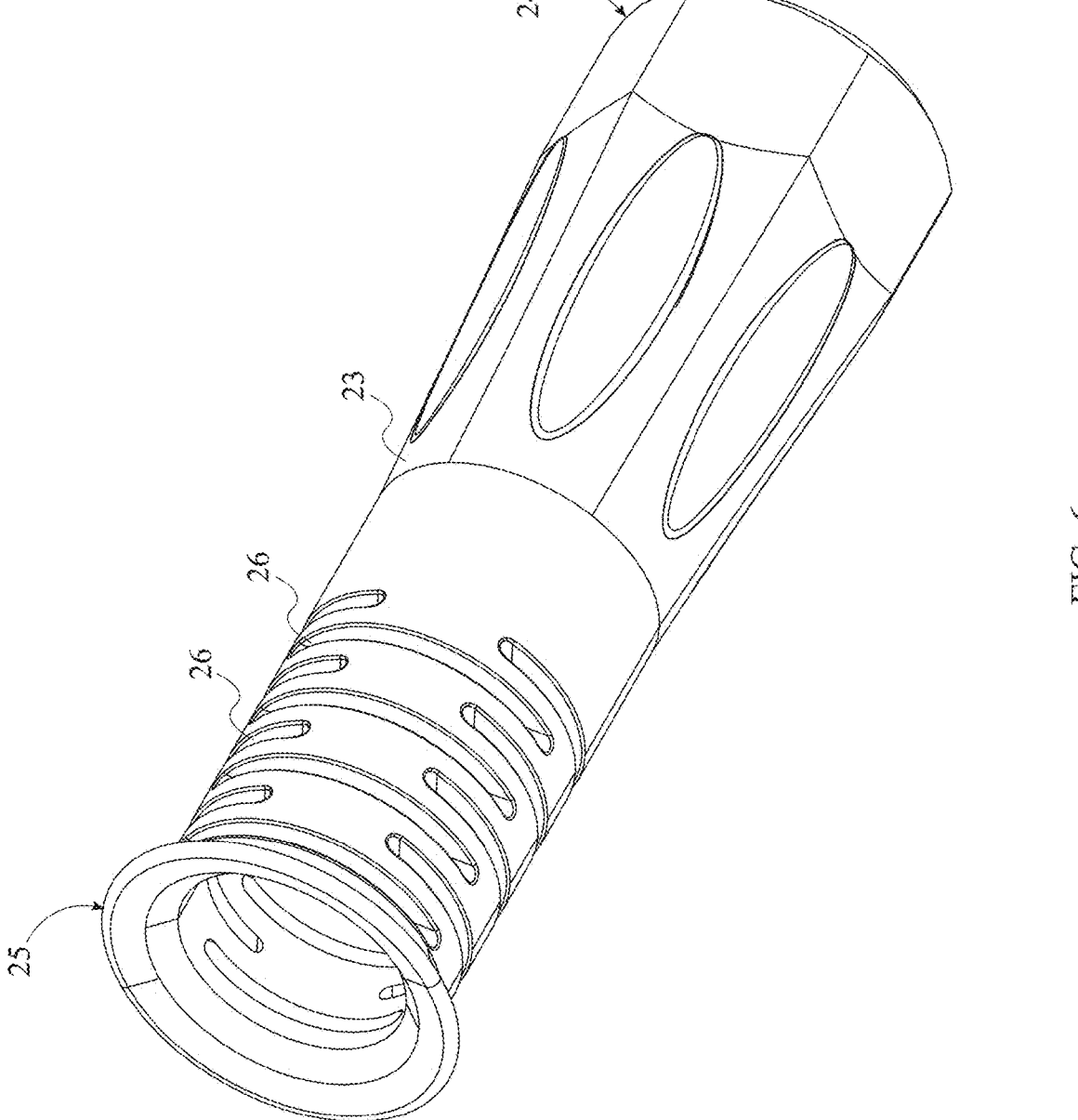
FIG. 6 is a bottom-rear perspective view thereof.
Figure 7:
FIG. 7 is a top-front-exploded perspective view thereof.
Figure 8:
FIG. 8 is a top-front-exploded perspective view of the first subassembly of the present invention.
Figure 9:
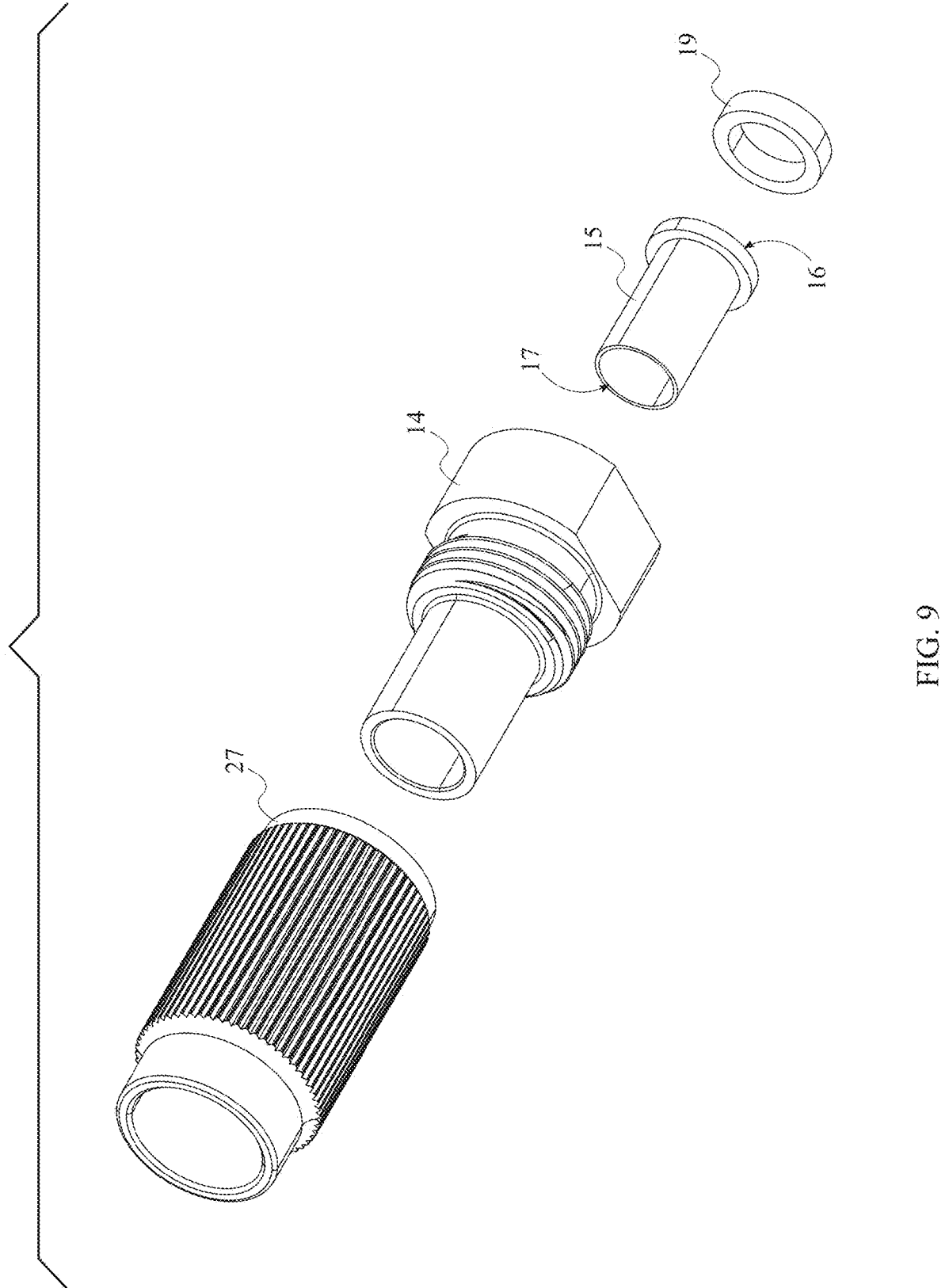
FIG. 9 is a bottom-rear-exploded perspective view thereof.
Figure 10:
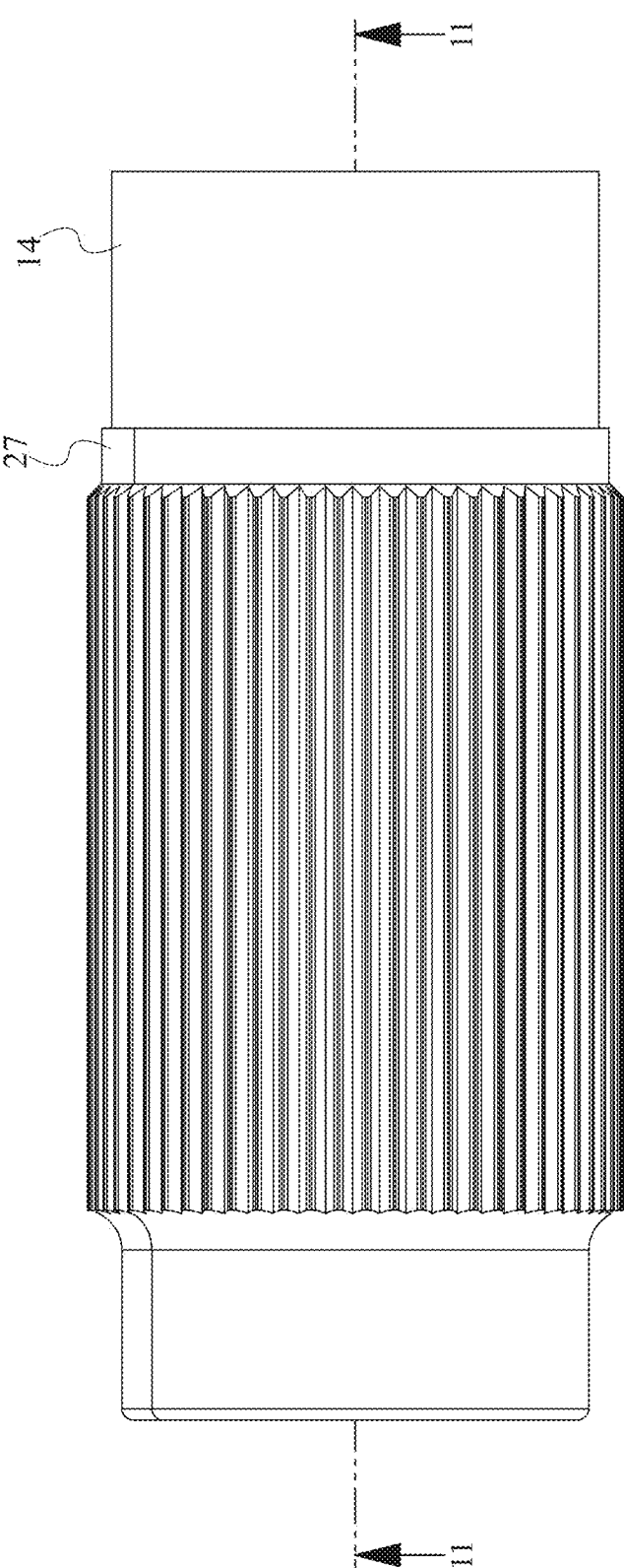
FIG. 10 is a top view thereof.
Figure 11:
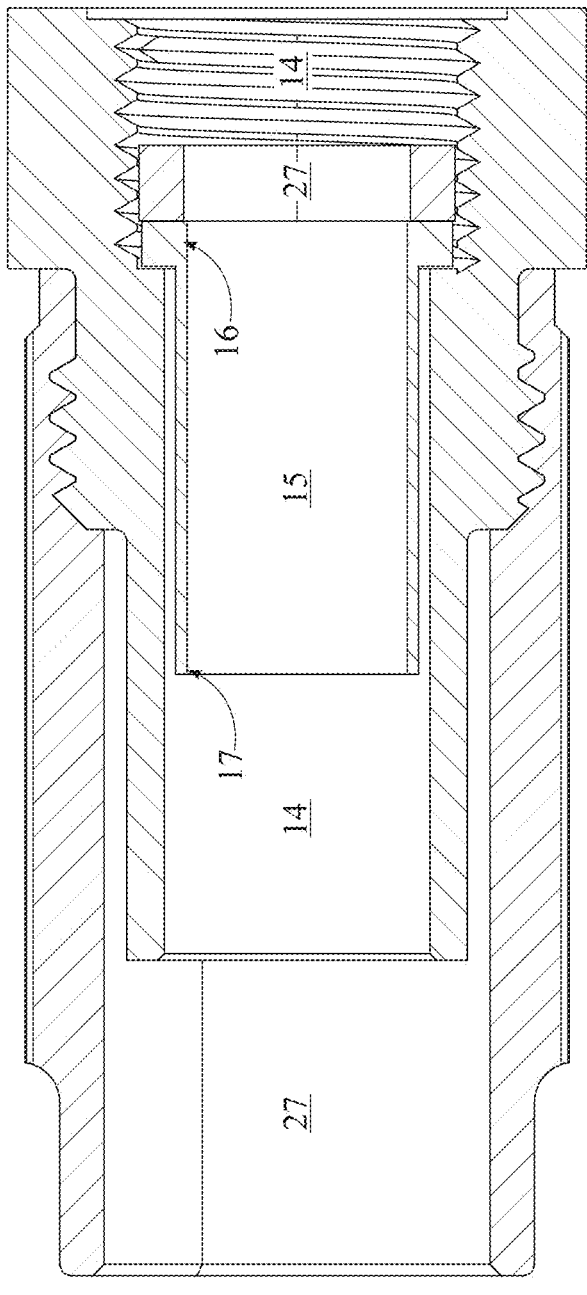
FIG. 11 is a horizontal cross-sectional view taken along line 11-11 in FIG. 10.
Figure 12:
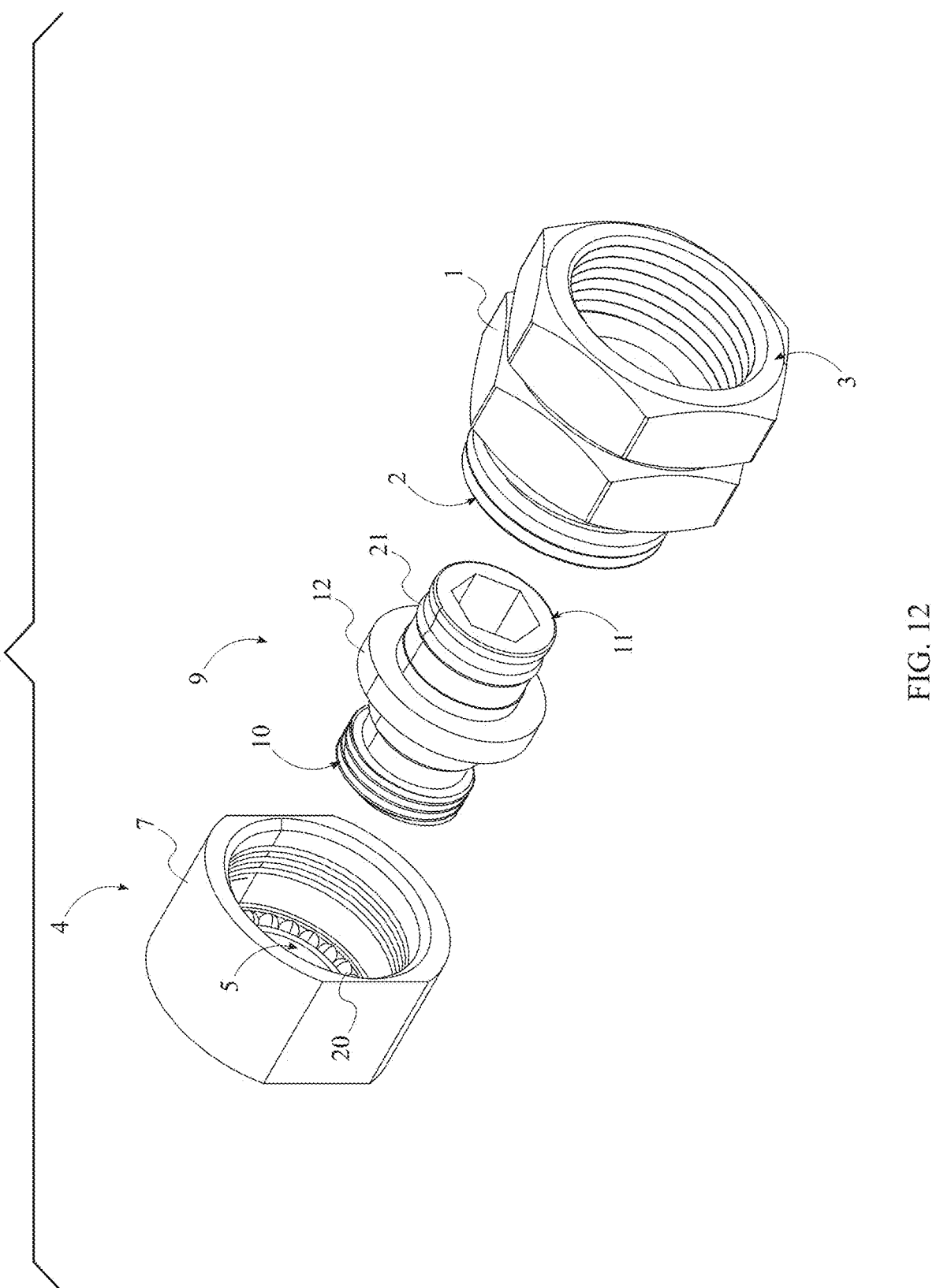
FIG. 12 is a top-front-exploded perspective view of the second subassembly of the present invention.
Figure 13:
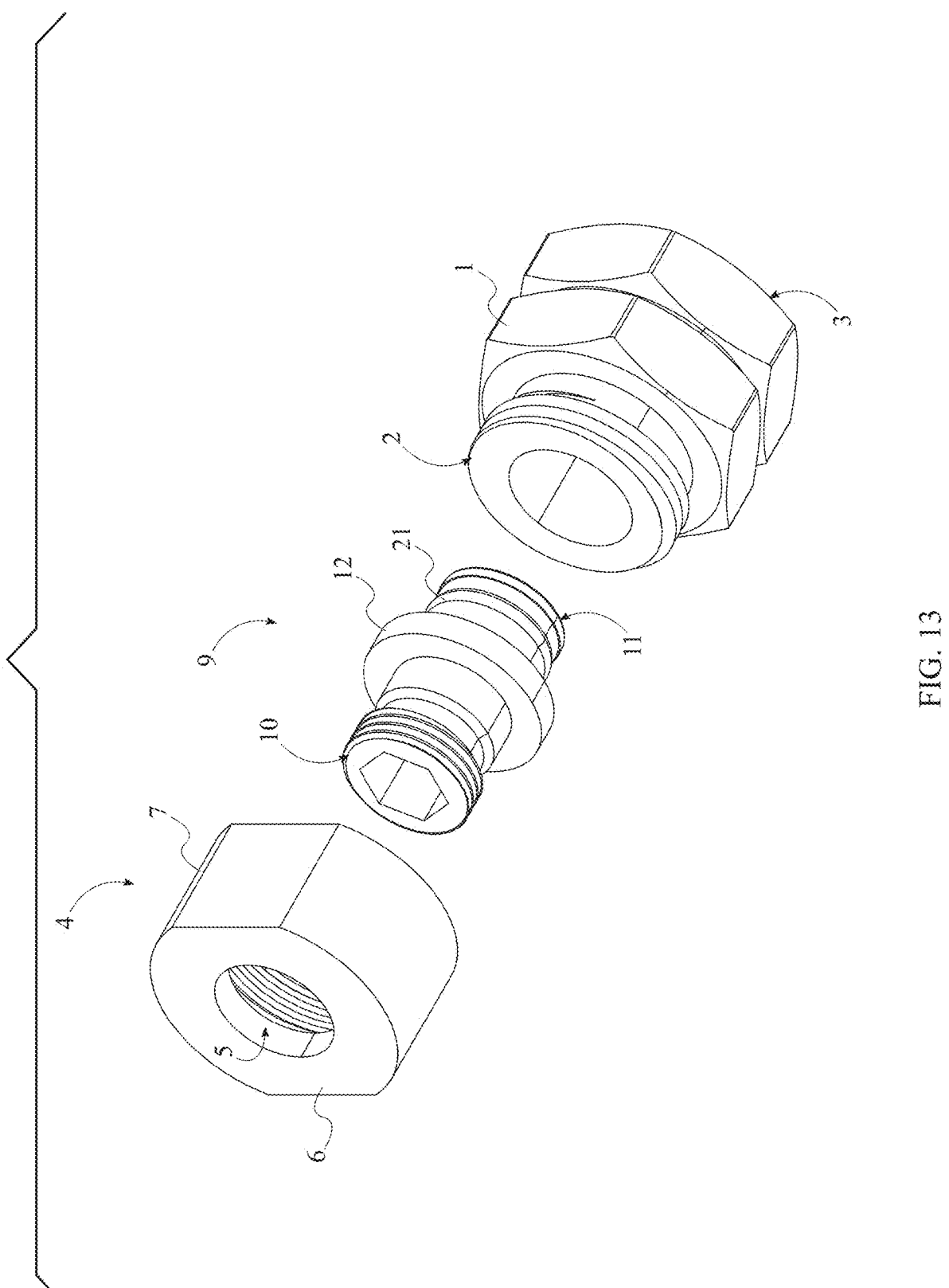
FIG. 13 is a bottom-rear-exploded perspective view thereof.
Figure 14:
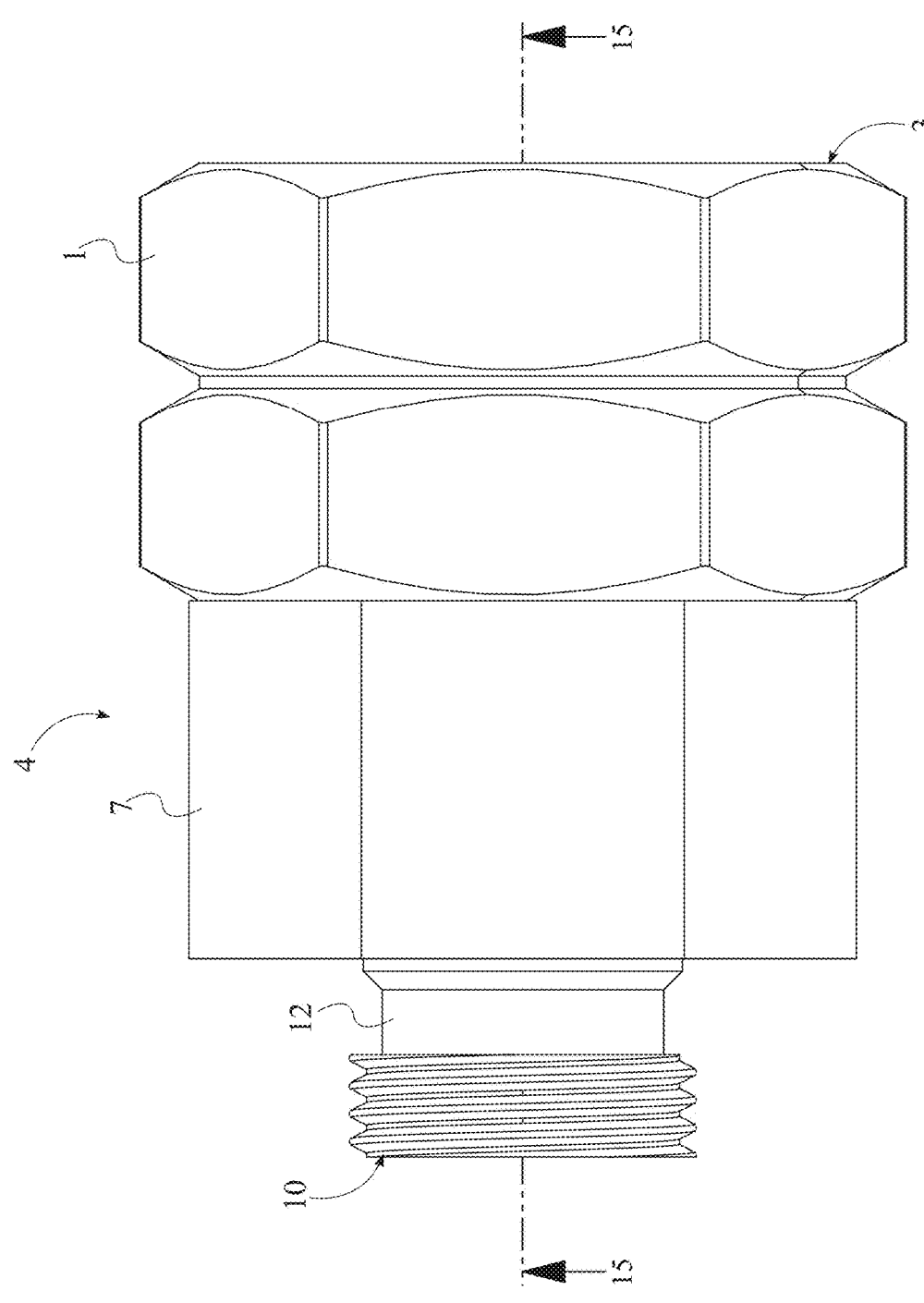
FIG. 14 is a top view thereof.
Figure 15:
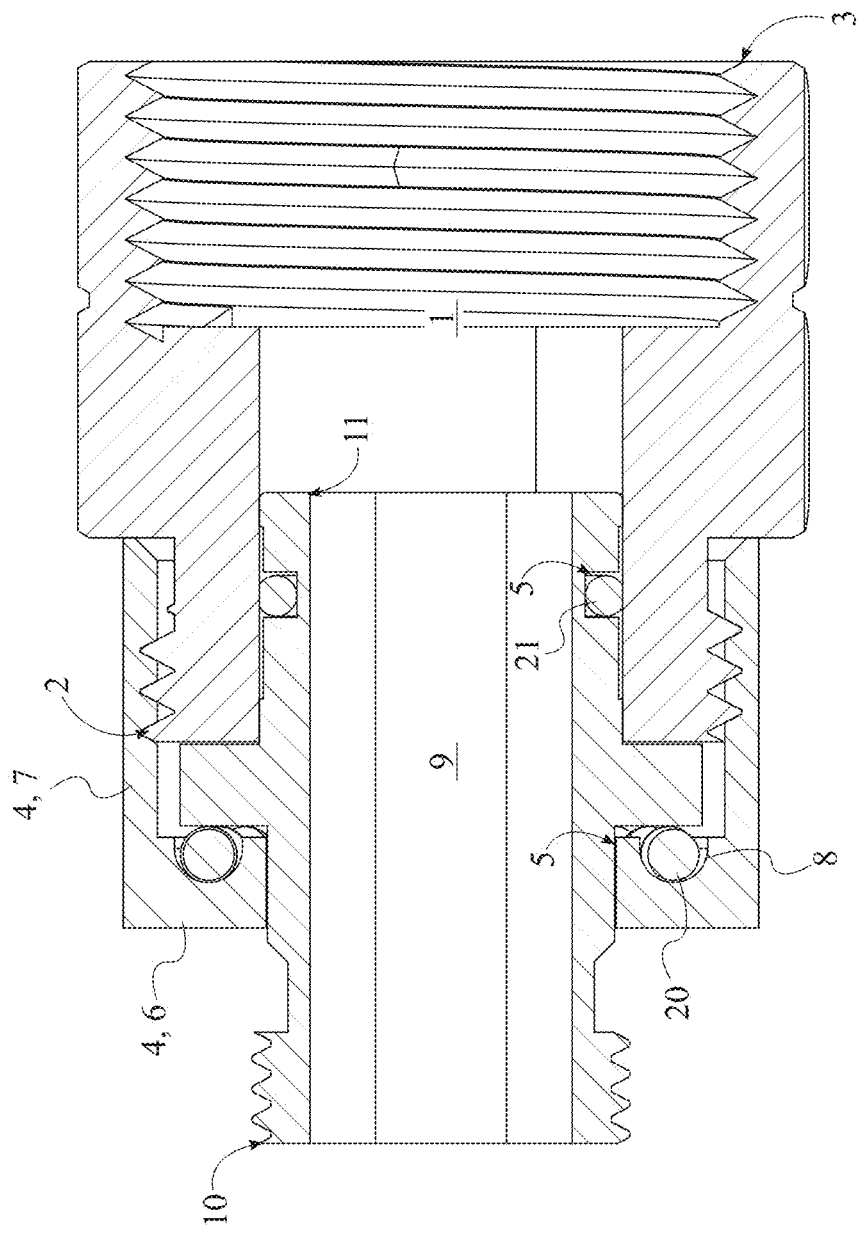
FIG. 15 is a horizontal cross-sectional view taken along line 15-15 in FIG. 14.
Figure 16:
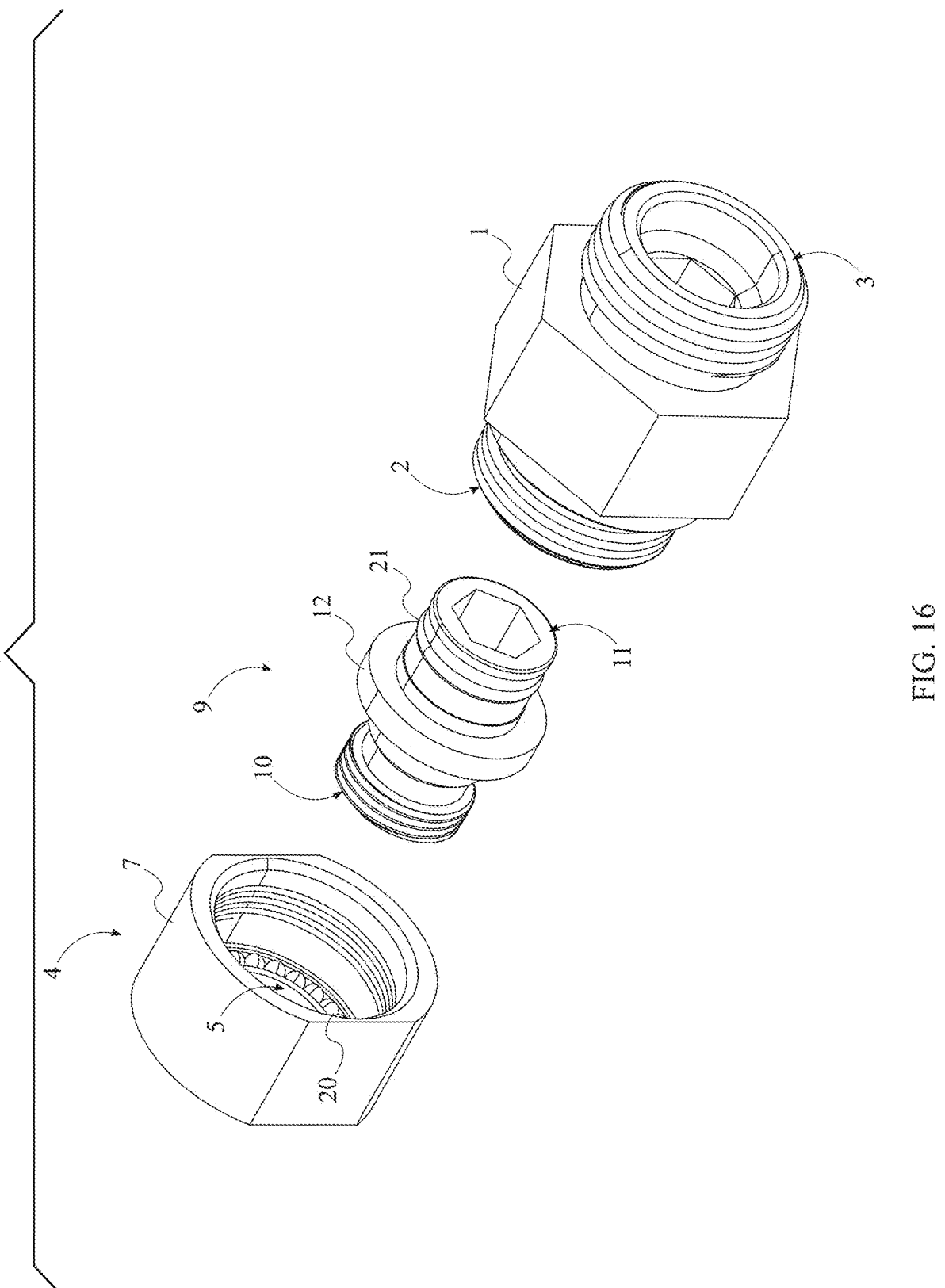
FIG. 16 is a top-front-exploded perspective view of an alternative embodiment of the second subassembly of the present invention.
Figure 17:
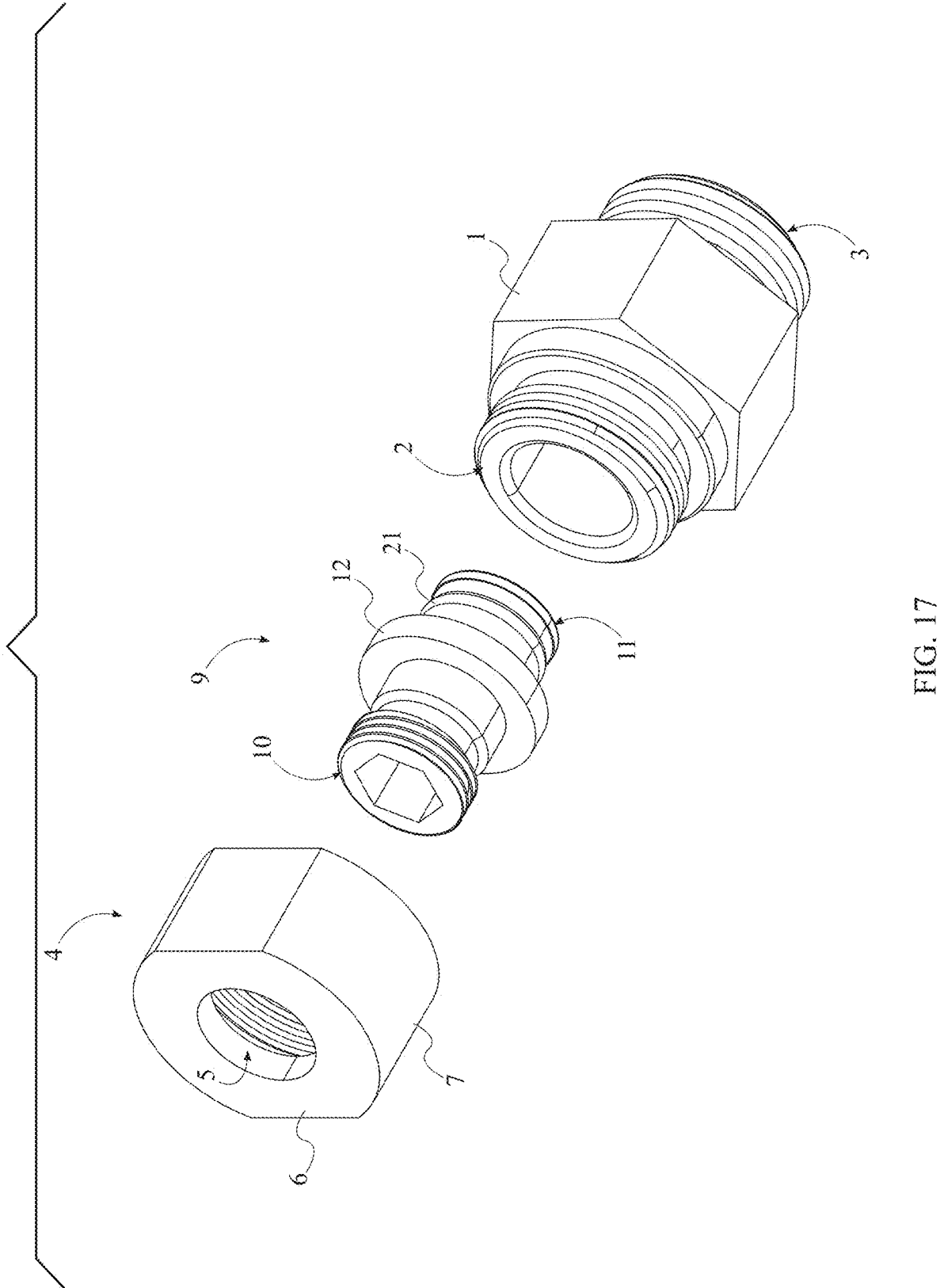
FIG. 17 is a bottom-rear-exploded perspective view thereof.
Figure 18:
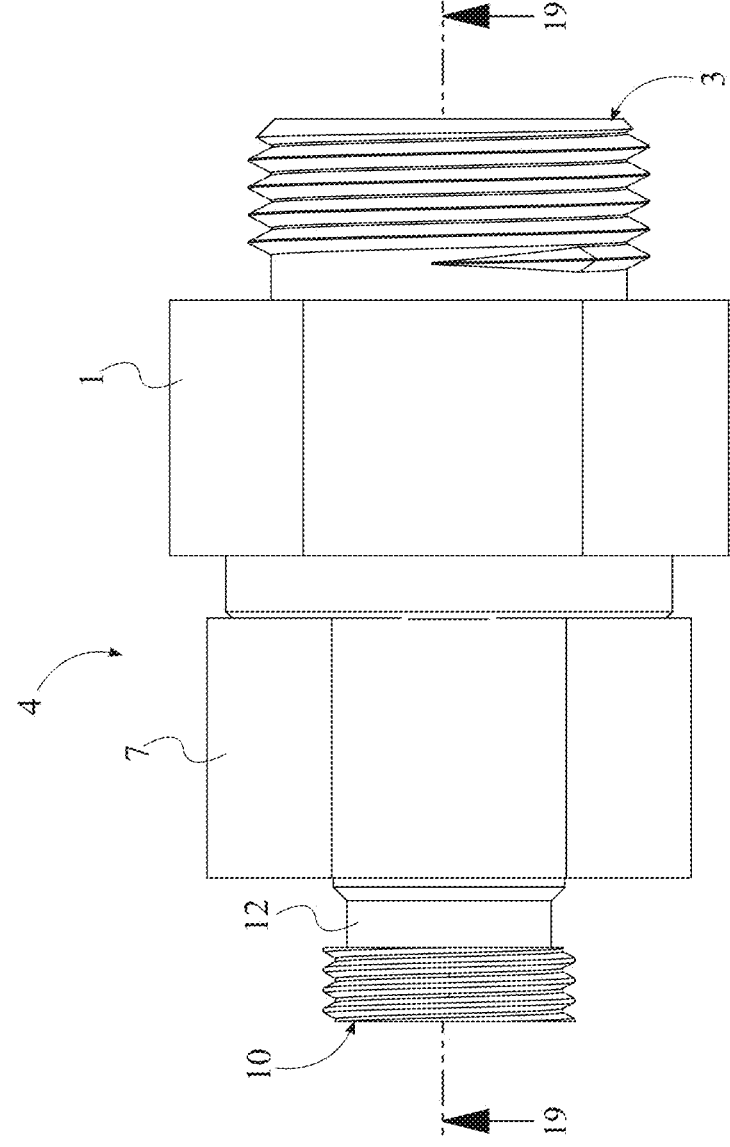
FIG. 18 is a top view thereof.
Figure 19:
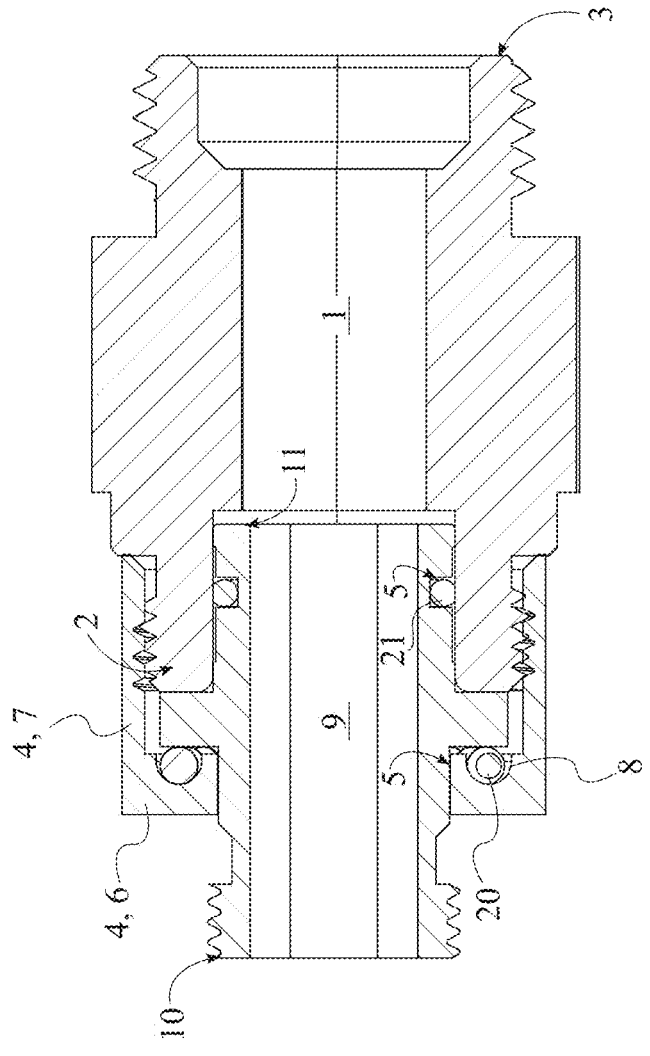
FIG. 19 is a horizontal cross-sectional view taken along line 19-19 in FIG. 18.
Figure 20:
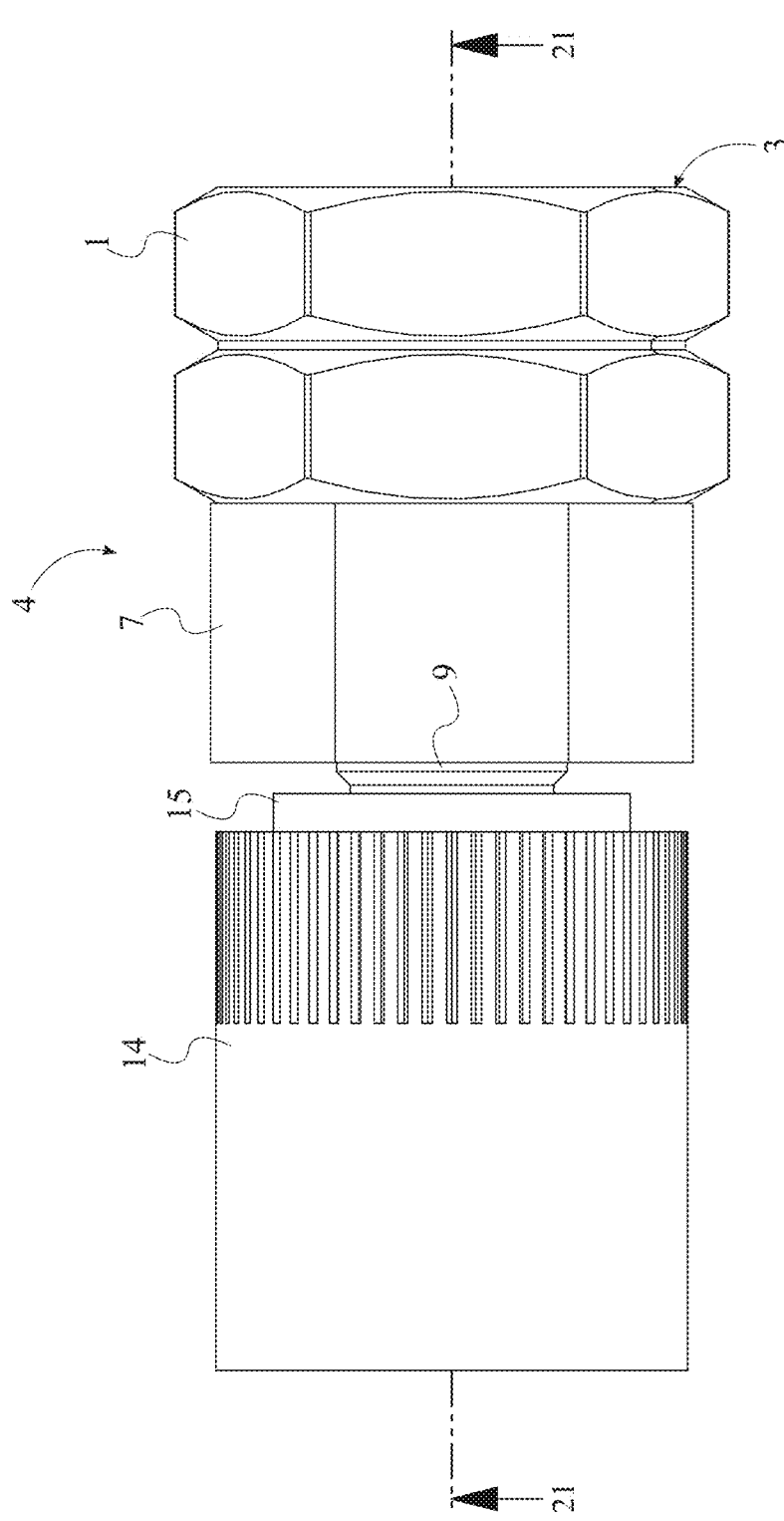
FIG. 20 is a top view of the present invention, wherein an alternate embodiment of the first subassembly of the present invention for a single layer hose is shown.
Figure 21:
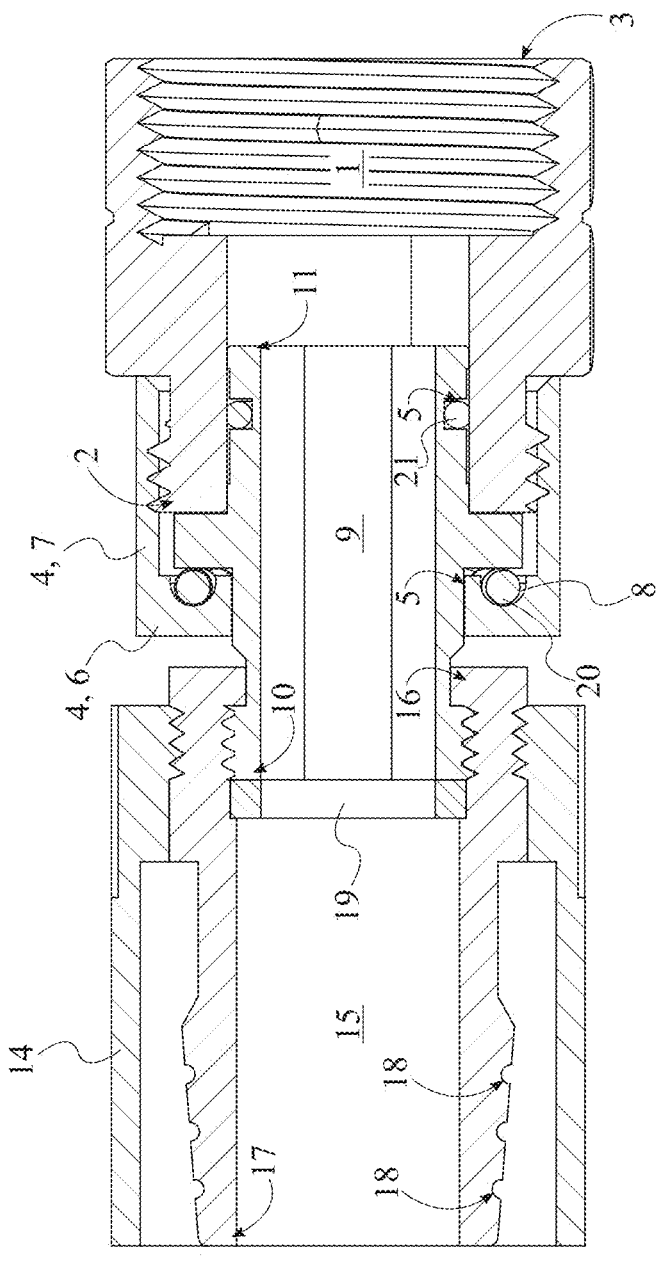
FIG. 21 is a horizontal cross-sectional view taken along line 21-21 in FIG. 20.
Figure 22:
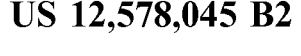
FIG. 22 is a top-front-exploded perspective view of the alternative embodiment of the first subassembly of the present invention.
Figure 23:
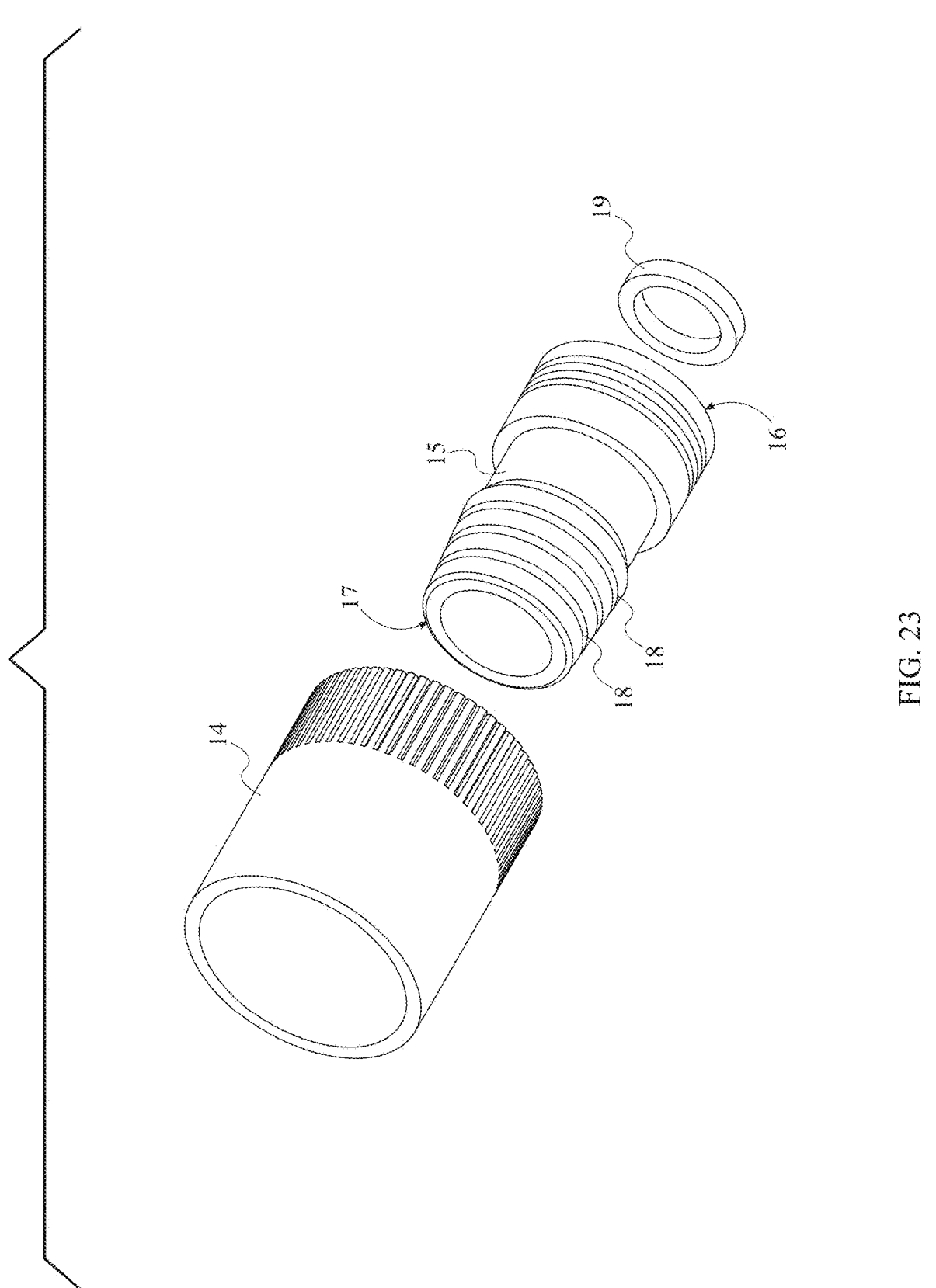
FIG. 23 is a bottom-rear-exploded perspective view thereof.
Figure 24:
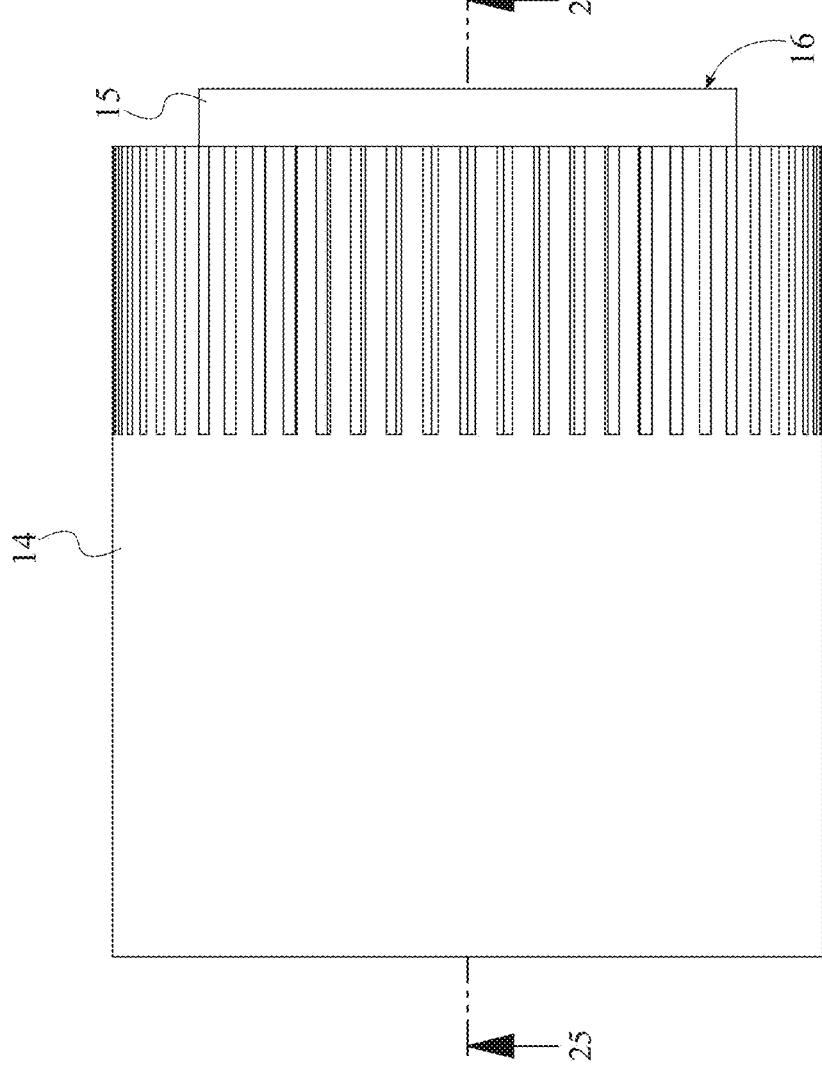
FIG. 24 is a top view thereof.
Figure 25:
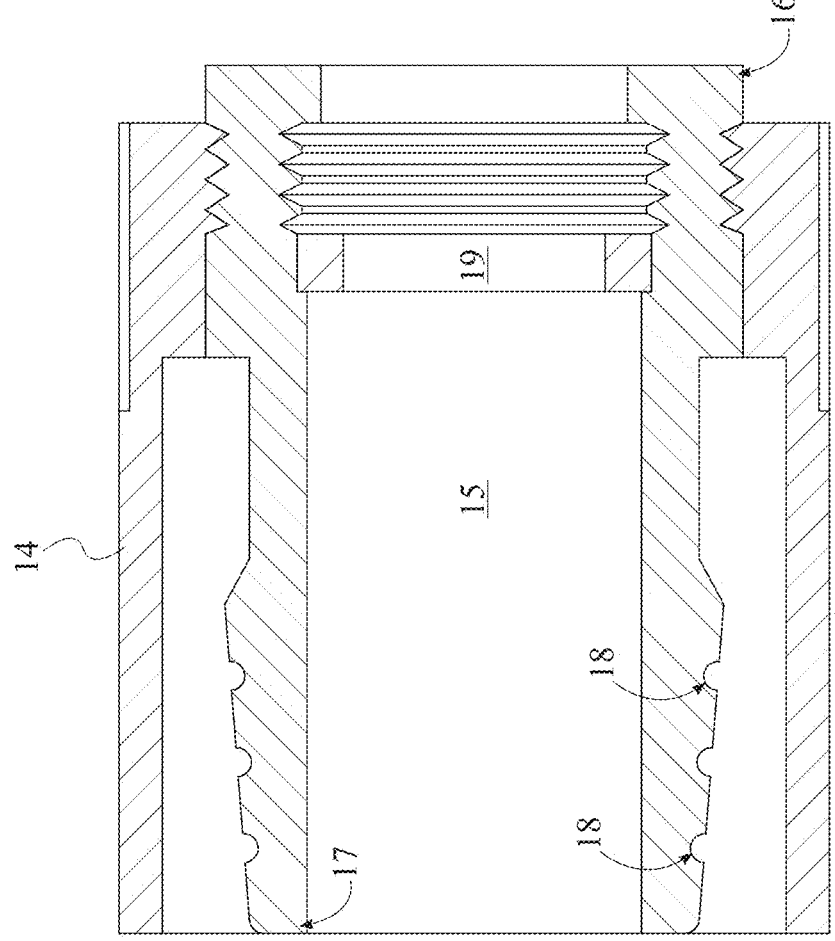
FIG. 25 is a horizontal cross-sectional view taken along line 25-25 in FIG. 24.

All illustrations of the drawings are for the purpose of describing selected versions of the present invention and are not intended to limit the scope of the present invention.

The present invention discloses a hose connector assembly. The hose connector assembly serves as a rotatable pipe joint that allows the formation of a fluid connection between separate plumbing parts such as a hose and a water spout. As can be seen in FIGS. 1 through 4, 20, and 21, the present invention comprises a hose adapter 1, a screw cap 4, an intermediate fitting 9, a proximal annular brace 14, and a hose connector 15. The hose adapter 1 allows the secure connection of the present invention to a plumbing part, such as a spout, a hose, etc. The screw cap 4 allows the rotation of the intermediate fitting 9 so that modular subassemblies of the present invention can rotate about the intermediate fitting 9. The intermediate fitting 9 also allows the detachable connection between the modular subassemblies of the present invention without additional tools. The hose connector 15 facilitates the attachment of the present invention to a target hose end. The proximal annular brace 14 ensures the secure connection of the hose connector 15 to the target hose end.

The general configuration of the aforementioned components allows the user to connect two plumbing parts including, but not limited to, tubing, hoses, pipe fittings, hose fittings, etc. As can be seen in FIGS. 1 through 4, 20, and 21, the hose adapter 1 is designed to enable the connection of the present invention to a plumbing part such as a water spout or to another hose/tubing. For example, the hose adapter 1 can be male-to-female adapter or a male-to-male adapter. In addition, the hose adapter 1 comprises a first adapter end 2 and a second adapter end 3 corresponding to the terminal ends of the hose adapter 1. Further, the screw cap 4 is designed as a short cylindrical and hollow structure with a size large enough to accommodate the intermediate fitting 9 as well as the hose adapter 1. In addition, the screw cap 4 comprises a cap hole 5 that allows a portion of the intermediate fitting 9 to extend past the screw cap 4. Further, the intermediate fitting 9 can be designed as a male-to-male fitting that allows water flow through the intermediate fitting 9 while allowing the different subassemblies of the present invention to be detachably connected to each other. In addition, the intermediate fitting 9 comprises a first male fitting end 10 and a second male fitting end 11 corresponding to the terminal ends of the intermediate fitting 9.

As can be seen in FIGS. 1 through 4, 20, and 21, the present invention can be arranged as follows: the hose connector 15, the proximal annular brace 14, the screw cap 4, the intermediate fitting 9, and the hose adapter 1 are axially positioned with each other to form an overall cylindrical structure. Further, the hose connector 15 is mounted within the proximal annular brace 14 so that the proximal annular brace 14 surrounds the hose connector 15. When the hose connector 15 is coupled to the target hose end, the proximal annular brace 14 ensures that the target hose end remains attached to the hose connector 15. This way, the hose connector 15 and the proximal annular brace 14 form a first subassembly that is connected to the target hose end. Further, the intermediate fitting 9 is rotatably mounted to the screw cap 4 so that the intermediate fitting 9 can rotate within the screw cap 4 even after the whole assembly has been put together. In addition, the first male fitting end 10 is positioned through the cap hole 5 so that the first male fitting end 10 can be coupled to the hose connector 15. In addition, the second male fitting end 11 is mounted into the first adapter end 2 to allow the rotation of the intermediate fitting 9 within the hose adapter 1. Further, the first adapter end 2 is torsionally mounted to the screw cap 4 to secure the intermediate fitting 9 between the screw cap 4 and the hose adapter 1. This way, the screw cap 4, the intermediate fitting 9, and the hose adapter 1 form a second subassembly that is connected to a plumbing part, such as a water spout or another hose. Furthermore, to connect both subassemblies together, the first male fitting end 10 is mounted to the hose connector 15. This way, the user can first connect each subassembly to the corresponding plumbing part before connecting the subassemblies together. In other embodiments, different arrangements can be implemented to accommodate different plumbing parts.

As previously discussed, the hose connector 15 is designed to enable the connection of the present invention to the target hose end. The hose adapter 1 can be designed to accommodate single-layer or multi-layer hoses/tubing. As can be seen in FIGS. 20 through 25, the hose connector 15 can be designed as a male-to-male connector for single-layer hoses/tubing. In this embodiment, the hose connector 15 can comprise a first connector end 16, a second connector end 17, and a plurality of ridges 18. The first connector end 16 and the second connector end 17 correspond to the terminal male ends of the hose connector 15. The plurality of ridges 18 facilitate the coupling of the hose connector 15 to the target hose end. This embodiment of the hose connector 15 can be arranged as follows: the first male fitting end 10 is positioned within the first connector end 16 to facilitate the coupling of the intermediate fitting 9 to the hose connector 15. Further, the first male fitting end 10 is threadably engaged to the first connector end 16 to secure the intermediate fitting 9 to the hose connector 15. In addition, the first connector end 16 is terminally positioned within the proximal annular brace 14 to facilitate the coupling of the hose connector 15 to the proximal annular brace 14. Further, the first connector end 16 is threadably engaged to the proximal annular brace 14 to secure the hose connector 15 to the proximal annular brace 14. Furthermore, the plurality of ridges 18 is laterally connected about the second connector end 17 to enable the hose connector 15 to be securely coupled to the target hose end.

To further facilitate the leak-proof connection between the hose connector 15 and the intermediate fitting 9, the present invention may further comprise a connector O-ring 19. As can be seen in FIGS. 20 through 25, the connector O-ring 19 hermetically seals the connection between the first connector end 16 and the first male fitting end 10. To do so, the connector O-ring 19 is axially aligned with the hose connector 15 to not block the water flow through the hose connector 15. In addition, the connector O-ring 19 is positioned within the first connector end 16 to position the connector O-ring 19 against the first male fitting end 10. Further, the first connector end 16 and the first male fitting end 10 are hermetically coupled to each other by the connector O-ring 19 to properly seal the connection between the hose connector 15 and the intermediate fitting 9. In other embodiments, different sealing mechanisms can be implemented.

As previously discussed, the screw cap 4 is designed to enable the rotation of the intermediate fitting 9 which allows the connected plumbing parts to freely rotate to prevent damage to the parts. As can be seen in FIGS. 12 through 15, the screw cap 4 is designed to retain the intermediate fitting 9 against the hose adapter 1. To do so, the screw cap 4 may further comprise a base platform 6 and a lateral wall 7. The base platform 6 corresponds to the disc-shaped portion of the screw cap 4, while the lateral wall 7 corresponds to the cylindrical portion of the screw cap 4. The screw cap 4 can be arranged as follows: the lateral wall 7 is positioned perpendicular to the base platform 6 to form a cylindrical structure with a closed end (the base platform 6) and an open end. Further, the lateral wall 7 is perimetrically connected around the base platform 6 to secure the lateral wall 7 to the base platform 6. Further, the cap hole 5 centrally traverses through the base platform 6 to allow the first male fitting end 10 to protrude through the screw cap 4. In addition, the first adapter end 2 is positioned within the lateral wall 7, offset from the base platform 6, to allow the screw cap 4 to couple with the hose adapter 1. Furthermore, the first adapter end 2 is threadably engaged to the lateral wall 7 to secure the screw cap 4 to the hose adapter 1. In other embodiments, the screw cap 4 can be altered to accommodate different hose adapters.

As can be seen in FIGS. 12 through 15, to facilitate the rotation of the intermediate fitting 9 within the screw cap 4, the present invention may further comprise a plurality of ball bearings 20. In addition, the screw cap 4 may further comprise a bearing annular groove 8 to accommodate the plurality of ball bearings 20. The intermediate fitting 9 may further comprise a fitting flange 12 to provide a structure that allows the intermediate fitting 9 to rotate within the screw cap 4. To implement the plurality of ball bearings 20, the fitting flange 12 is positioned in between the first male fitting end 10 and the second male fitting end 11 to position the fitting flange 12 central along the intermediate fitting 9. In addition, the bearing annular groove 8 traverses into the base platform 6 to form an annular space to accommodate the plurality of ball bearings 20. Furthermore, the plurality of ball bearings 20 is also rollably positioned in between the fitting flange 12 and the annular groove to facilitate the rotation between the intermediate fitting 9 and the screw cap 4. In other embodiments, different rotation mechanisms can be implemented for the intermediate fitting 9.

The rotational capabilities of the intermediate fitting 9 may result in potential leaking of water around the intermediate fitting 9 and the screw cap 4. As can be seen in FIGS. 12 through 15, the present invention may further comprise a fitting O-ring 21 that prevents water leakage around the intermediate fitting 9 without restricting the rotation of the intermediate fitting 9 within the screw cap 4 and the hose adapter 1. To accommodate the fitting O-ring 21, the intermediate fitting 9 may further comprise a fitting annular groove 13. The fitting O-ring 21 can be incorporated as follows: the fitting annular groove 13 is integrated into the second male fitting end 11 to positioned the fitting O-ring 21 in between the second male fitting end 11 and the first adapter end 2. Further, the fitting O-ring 21 is mounted into and around the fitting annular groove 13 to secure the fitting O-ring 21 within the fitting annular groove 13. Furthermore, the first adapter end 2 and the second male fitting end 11 are hermetically coupled to each other by the fitting O-ring 21 to prevent leaking of water around the intermediate fitting 9. In other embodiments, different sealing mechanisms can be implemented.

Figure 26:
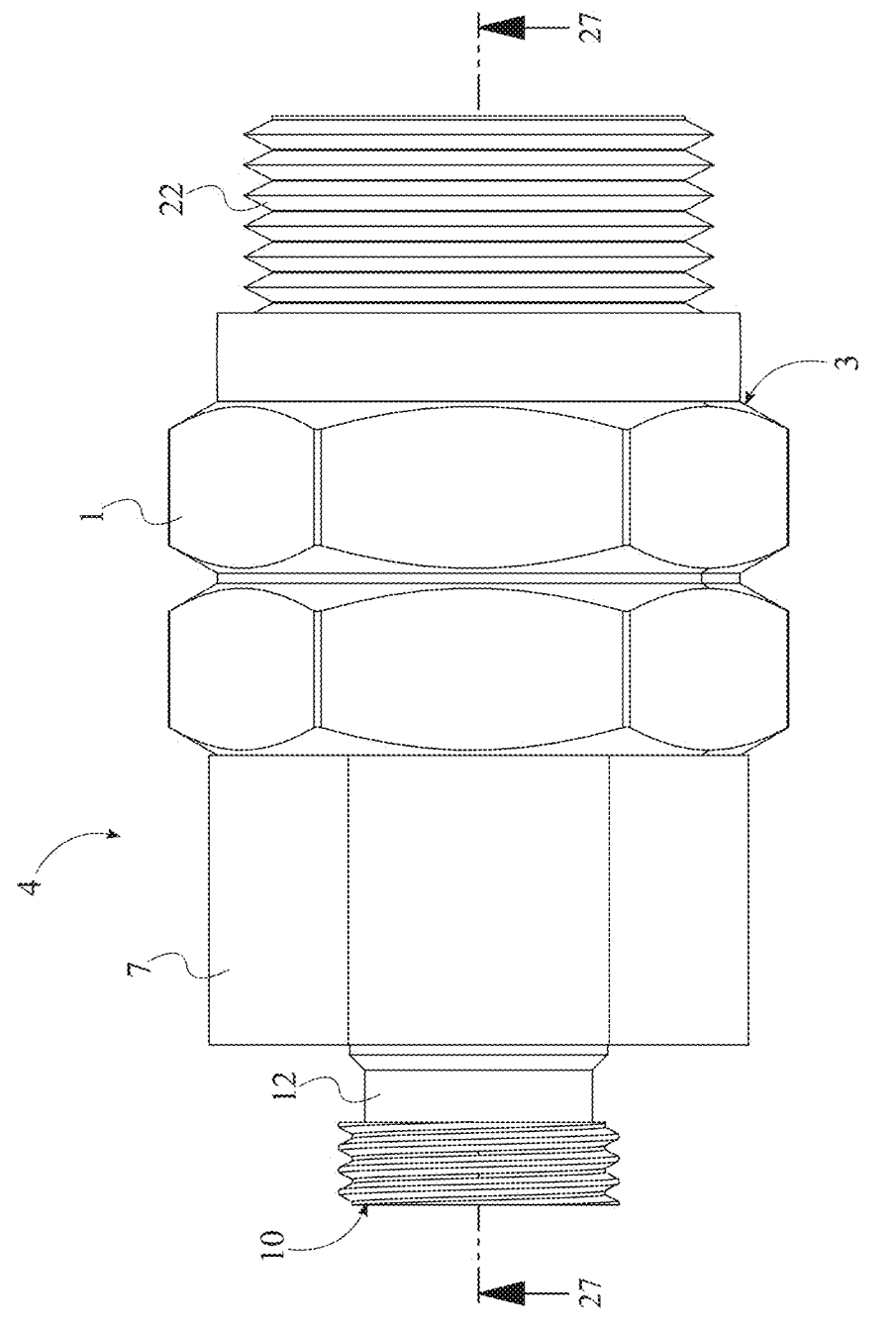
FIG. 26 is a top view the second subassembly of the present invention, wherein the present invention is shown with a male-end adapter.
Figure 27:
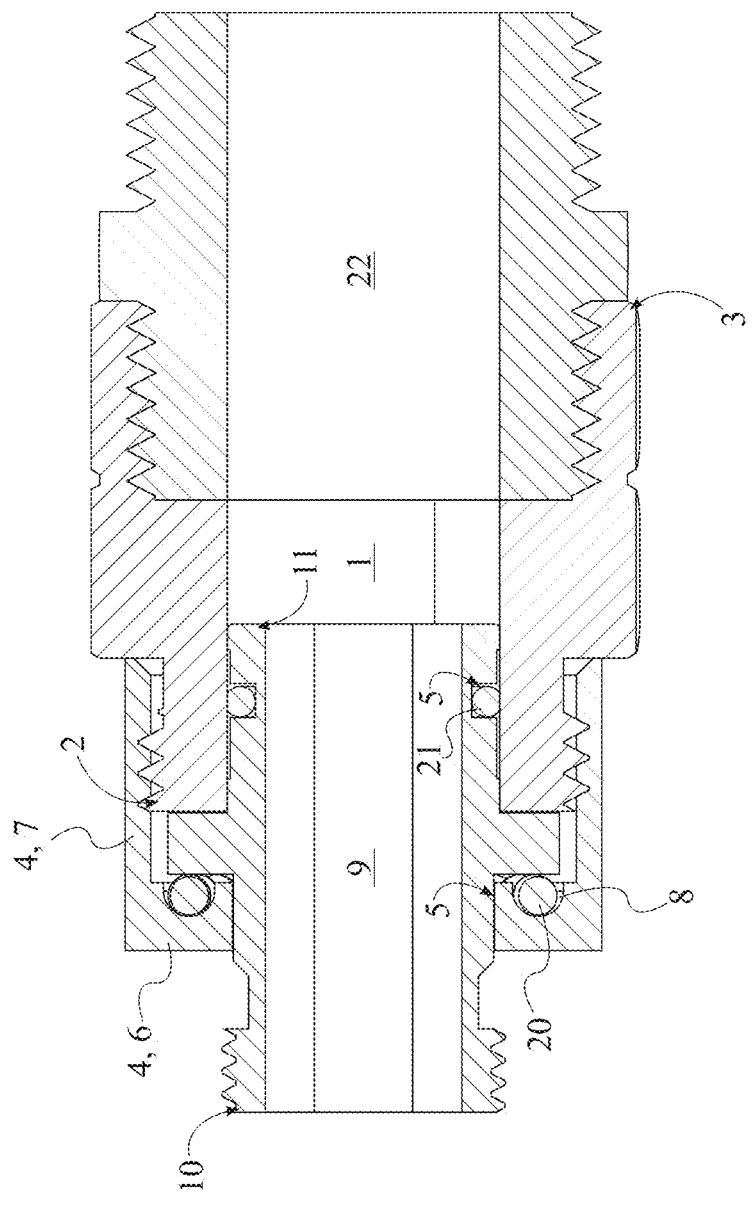
FIG. 27 is a horizontal cross-sectional view taken along line 27-27 in FIG. 26.

As previously discussed, the hose adapter 1 allows the connection of the present invention to a plumbing part, such as a faucet. As can be seen in FIGS. 12 through 15, if the hose adapter 1 is a male-to-female adapter, the second adapter end 3 is a female-threaded end. This allows the hose adapter 1 to be coupled to a male end of the plumbing part. However, if the plumbing part includes a female end, the present invention may further include a male-end adapter 22 that allows the hose adapter 1 to be connected to a female end of the plumbing part, as can be seen in FIGS. 26 and 27. To do so, the male-end adapter 22 is positioned into the second adapter end 3 to enable the coupling of the male-end adapter 22 to the female-threaded end of the hose adapter 1. Furthermore, the male-end adapter 22 is threadably engaged to the second adapter end 3 to enable the fastening of the male-end adapter 22 to the hose adapter 1. Alternatively, the hose adapter 1 can be provided as a male-to-male adapter so that the hose adapter 1 can be coupled to the female end of the plumbing part without additional end adapters. As can be seen in FIGS. 16 through 19, the second adapter end 3 can be a male-threaded end that can directly engage with the female end of the plumbing part. In other embodiments, different adapter designs can be implemented for other plumbing parts.

Due to the modular design of the present invention, the different connections between each component can be exposed to the weather and damage the modular components. As can be seen in FIGS. 1 through 7, the present invention may further comprise an outer sleeve 23 that covers the whole assembly. The outer sleeve 23 is preferably an elongated hollow structure with a size and shape matching the size and shape of the whole assembly. So, the outer sleeve 23 comprises a first sleeve end 24 and a second sleeve end 25 corresponding to the terminal ends of the outer sleeve 23. The outer sleeve 23 is preferably made of a rigid material; however, other flexible materials can be implemented. Further, the hose connector 15, the proximal annular brace 14, the screw cap 4, and the hose adapter 1 are positioned within the outer sleeve 23 so that the outer sleeve 23 encloses the whole assembly. Further, the first sleeve end 24 is mounted around the hose adapter 1 to secure the first sleeve end 24 to the hose adapter 1. In addition, the second sleeve end 25 is positioned around the hose connector 15 so that the outer sleeve 23 fully covers the whole assembly.

As can be seen in FIGS. 1 through 7, the outer sleeve 23 can be designed to accommodate the movement of the target hose end that is connected to the present invention. To do so, the outer sleeve 23 may further comprise a plurality of flexibility cuts 26 that allow the portion of the outer sleeve 23 adjacent to the hose connector 15 to flex along with the target hose end. The plurality of flexibility cuts 26 is distributed about and along the outer sleeve 23, offset from the first sleeve end 24, so that the portion of the outer sleeve 23 adjacent to the hose connector 15 can flex. In other embodiments, different designs of the outer sleeve 23 can be implemented to accommodate different requirements.

As previously discussed, the hose connector 15 of the present invention can accommodate different hoses/tubing. As can be seen in FIGS. 1 through 11, the hose connector 15 can be positioned within the proximal annular brace 14 to accommodate a hose connector 15 that can be coupled to a multi-layer hose/tubing. The first connector end 16 is mounted within the proximal annular brace 14 without engaging the first male fitting end 10 so that the first male fitting end 10 can couple with the proximal annular brace 14. The inner layer of the hose/tubing can be coupled in between the proximal annular brace 14 and the second connector end 17. In addition, the outer layer of the hose/tubing is engaged around the proximal annular brace 14 to fully secure the target hose end to the first subassembly of the present invention. Further, the second male fitting end 11 is positioned into the proximal annular brace 14 to engage the proximal annular brace 14. Furthermore, the second male fitting end 11 is threadably engaged to the proximal annular brace 14 so that the intermediate fitting 9 can be secured to the proximal annular brace 14.

Similar to the single-layer embodiment, the present invention can also implement a connector O-ring 19 to seal the engagement of the first male fitting end 10 with the hose connector 15 and the proximal annular brace 14. As can be seen in FIGS. 1 through 11, the connector O-ring 19 is positioned in between the first male fitting end 10 and the first connector end 16 within the proximal annular brace 14. Further, the first male fitting end 10 and the first connector end 16 are hermetically coupled to each other by the connector O-ring 19 to prevent leaks from inside the proximal annular brace 14. In other embodiments, different sealing mechanisms can be implemented to accommodate multi-layer hoses/tubing.

To fully secure the multi-layer hose/tubing to the present invention, the present invention may further comprise a distal annular brace 27 that secures the outer layer of the hose/tubing to the proximal annular brace 14. As can be seen in FIGS. 1 through 11, the distal annular brace 27 is axially aligned with the proximal annular brace 14 to allow the connection of the distal annular brace 27 to the proximal annular brace 14. Further, the proximal annular brace 14 is positioned into the distal annular brace 27 so that the distal annular brace 27 is positioned around the proximal annular brace 14. The outer layer of the hose/tubing is then secured between the distal annular brace 27 and the proximal annular brace 14. Furthermore, the proximal annular brace 14 is threadably engaged to the distal annular brace 27 to secure the distal annular brace 27 to the proximal annular brace 14. In other embodiments, different arrangements can be implemented to accommodate different hose/tubing designs.

Although the invention has been explained in relation to its preferred embodiment, it is to be understood that many other possible modifications and variations can be made without departing from the spirit and scope of the invention.

What is claimed is:

1. A hose connector assembly comprising:
 a hose adapter;
 a screw cap;
 an intermediate fitting;
 a proximal annular brace;
 a hose connector;
 an outer sleeve;
 the hose adapter comprising a first adapter end and a second adapter end;
 the screw cap comprising a cap hole;
 the intermediate fitting comprising a first male fitting end and a second male fitting end;
 the outer sleeve comprising a first sleeve end and a second sleeve end;
 the hose connector, the proximal annular brace, the screw cap, the intermediate fitting, and the hose adapter being axially positioned with each other;
 the hose connector being mounted within the proximal annular brace;

the intermediate fitting being rotatably mounted to the screw cap;
 the first male fitting end being positioned through the cap hole;
 the first male fitting end being mounted to the hose connector;
 the second male fitting end being mounted into the first adapter end;
 the first adapter end being torsionally mounted to the screw cap;
 the outer sleeve being made of a rigid material;
 the hose connector, the proximal annular brace, the screw cap, and the hose adapter being positioned within the outer sleeve;
 the first sleeve end being mounted around the hose adapter; and
 the second sleeve end being positioned around the hose connector.

2. The hose connector assembly as claimed in claim 1 further comprising:
 the hose connector comprising a first connector end, a second connector end, and a plurality of ridges;
 the first male fitting end being positioned within the first connector end;
 the first male fitting end being threadably engaged to the first connector end;
 the first connector end being terminally positioned within the proximal annular brace;
 the first connector end being threadably engaged to the proximal annular brace; and
 the plurality of ridges being laterally connected about the second connector end.

3. The hose connector assembly as claimed in claim 2 further comprising:
 a connector O-ring;
 the connector O-ring being axially aligned with the hose connector;
 the connector O-ring being positioned within the first connector end; and
 the first connector end and the first male fitting end being hermetically coupled to each other by the connector O-ring.

4. The hose connector assembly as claimed in claim 1 further comprising:
 the screw cap further comprising a base platform and a lateral wall;
 the lateral wall being positioned perpendicular to the base platform;
 the lateral wall being perimetrically connected around the base platform;
 the cap hole centrally traversing through the base platform;
 the first adapter end being positioned within the lateral wall, offset from the base platform; and
 the first adapter end being threadably engaged to the lateral wall.

5. The hose connector assembly as claimed in claim 4 further comprising:
 a plurality of ball bearings;
 the screw cap further comprising a bearing annular groove;
 the intermediate fitting further comprising a fitting flange;
 the fitting flange being positioned in between the first male fitting end and the second male fitting end;
 the bearing annular groove traversing into the base platform; and the plurality of ball bearings being rollably positioned in between the fitting flange and the annular groove.

6. The hose connector assembly as claimed in claim 1 further comprising:

a fitting O-ring;

the intermediate fitting further comprising a fitting annular groove;

the fitting annular groove being integrated into the second male fitting end;

the fitting O-ring being mounted into and around the fitting annular groove; and the first adapter end and the second male fitting end being hermetically coupled to each other by the fitting O-ring.

7. The hose connector assembly as claimed in claim 1, wherein the second adapter end is a female-threaded end.

8. The hose connector assembly as claimed in claim 7 further comprising:

a male-end adapter;

the male-end adapter being positioned into the second adapter end; and the male-end adapter being threadably engaged to the second adapter end.

9. The hose connector assembly as claimed in claim 1, wherein the second adapter end is a male-threaded end.

10. The hose connector assembly as claimed in claim 1 further comprising:

the outer sleeve further comprising a plurality of flexibility cuts; and the plurality of flexibility cuts being distributed about and along the outer sleeve, offset from the first sleeve end.

11. The hose connector assembly as claimed in claim 1 further comprising:

the hose connector comprising a first connector end;

the hose connector being positioned within the proximal annular brace;

the first connector end being mounted within the proximal annular brace;

the first male fitting end being positioned into the proximal annular brace; and the first male fitting end being threadably engaged to the proximal annular brace.

12. The hose connector assembly as claimed in claim 11 further comprising:

a connector O-ring;

the connector O-ring being axially aligned with the hose connector;

the connector O-ring being positioned in between the first male fitting end and the first connector end; and the first male fitting end and the first connector end being hermetically coupled to each other by the connector O-ring.

13. The hose connector assembly as claimed in claim 11 further comprising:

a distal annular brace;

the distal annular brace being axially aligned with the proximal annular brace;

the proximal annular brace being positioned into the distal annular brace; and the proximal annular brace being threadably engaged to the distal annular brace.

\* \* \* \* \*